(12) United States Patent
Ducharme et al.

(10) Patent No.: US 10,370,199 B2
(45) Date of Patent: Aug. 6, 2019

(54) SYSTEM AND METHOD FOR PALLETIZING

(71) Applicant: SYMBOTIC CANADA ULC, Montreal (CA)

(72) Inventors: Marc Ducharme, Montreal (CA); Jean-Francois Forget, Montreal (CA); Robert Jodoin, Montreal (CA); Cédric Kessler, Montreal (CA); Régis Métivier, Montreal (CA); Sylvain-Paul Morency, Montreal (CA)

(73) Assignee: SYMBOTIC CANADA ULC (CA)

( * ) Notice: Subject to any disclaimer, the term of this patent is extended or adjusted under 35 U.S.C. 154(b) by 0 days.

(21) Appl. No.: 15/235,254

(22) Filed: Aug. 12, 2016

(65) Prior Publication Data

US 2017/0043986 A1 Feb. 16, 2017

Related U.S. Application Data

(60) Provisional application No. 62/204,157, filed on Aug. 12, 2015.

(51) Int. Cl.
| | |
|---|---|
| *B65G 49/05* | (2006.01) |
| *B66F 9/07* | (2006.01) |
| *B65G 57/03* | (2006.01) |
| *B65G 57/00* | (2006.01) |
| *B65G 61/00* | (2006.01) |

(52) U.S. Cl.
CPC ........... *B65G 57/035* (2013.01); *B65G 57/00* (2013.01); *B65G 61/00* (2013.01); *B65G 2201/0267* (2013.01)

(58) Field of Classification Search
CPC ............. Y10S 414/106; Y10S 414/103; Y10S 414/108; Y10S 414/107; Y10S 414/112; Y10S 414/116; B65G 57/06; B65G 57/245; B65G 57/035; B65G 60/00; B65H 2301/42256; B65H 31/18; B65B 35/52
USPC ... 414/277, 788.7, 789.9, 790, 793.4, 796.4, 414/796.7, 927–929, 799
See application file for complete search history.

(56) References Cited

U.S. PATENT DOCUMENTS

| | | | | | |
|---|---|---|---|---|---|
| 2,774,489 | A | * | 12/1956 | Guigas | B65G 57/06 414/788.8 |
| 3,007,585 | A | * | 11/1961 | Geisler | B65G 57/00 187/255 |
| 3,050,199 | A | * | 8/1962 | McGrath | B65G 57/00 221/211 |
| 3,402,830 | A | * | 9/1968 | Copping | B65G 57/00 414/792.6 |
| 3,844,422 | A | * | 10/1974 | Smith | B65G 57/245 414/789.9 |

(Continued)

*Primary Examiner* — Gregory W Adams
(74) *Attorney, Agent, or Firm* — Perman & Green, LLP

(57) ABSTRACT

A palletizing elevator is provided that lowers gradually a pallet thereon from an upper level as it is filled with products, and by providing an empty pallet infeed system that moves empty pallets towards the palletizing elevator simultaneously to the palletizing of products thereon. The empty pallet infeed system includes an empty pallet elevator for raising empty pallets to the upper level and a conveying system between the empty pallet elevator and the palletizing elevator for moving the empty pallets of from the empty pallet elevator at the upper level to the palletizing elevator while a pallet is moved by the palletizing elevator during its filling.

27 Claims, 8 Drawing Sheets

(56) References Cited

U.S. PATENT DOCUMENTS

| | | | | |
|---|---|---|---|---|
| 3,974,922 A * | 8/1976 | Selusnik | | B65G 59/026 198/433 |
| 4,058,225 A * | 11/1977 | Janson | | B65G 57/245 414/793.4 |
| 4,269,556 A * | 5/1981 | Martini | | B65H 31/32 271/218 |
| 4,557,656 A | 12/1985 | Ouellette | | |
| 4,658,715 A * | 4/1987 | Stobb | | B65G 57/035 100/2 |
| 5,096,369 A | 3/1992 | Ouellette | | |
| 5,102,282 A | 4/1992 | Maddox | | |
| 5,222,857 A * | 6/1993 | Hasegawa | | B65G 59/023 414/788.4 |
| 5,249,915 A * | 10/1993 | Ritola | | B65G 59/08 414/796.2 |
| 5,645,392 A * | 7/1997 | Leichty | | B65G 59/063 414/416.01 |
| 5,882,174 A * | 3/1999 | Woerner | | B65G 60/00 414/788.7 |
| 6,152,678 A * | 11/2000 | King | | B23Q 7/005 414/749.5 |
| 6,361,265 B1 * | 3/2002 | Mahoney | | B65G 47/54 198/468.6 |
| 6,371,720 B1 | 4/2002 | Ouellette | | |
| 6,394,744 B1 * | 5/2002 | Price | | B65G 60/00 414/411 |
| 6,629,812 B1 * | 10/2003 | Lee | | B65G 65/00 414/331.11 |
| 6,846,147 B2 * | 1/2005 | Maser | | B65G 49/085 414/331.09 |
| 6,957,943 B2 * | 10/2005 | Hahn | | B65G 57/06 414/788.7 |
| 7,329,083 B2 * | 2/2008 | Nakazato | | B65G 65/00 414/416.01 |
| 7,559,738 B2 * | 7/2009 | Salm | | B65G 25/08 414/799 |
| 7,585,143 B2 * | 9/2009 | Hanaoka | | B65G 65/00 198/465.3 |
| 7,743,910 B2 * | 6/2010 | Weber | | B23K 37/0461 198/346.1 |
| 8,465,249 B2 * | 6/2013 | Zahn | | B65G 47/90 271/192 |
| 8,468,781 B2 | 6/2013 | Fritzsche et al. | | |
| 8,790,061 B2 * | 7/2014 | Yamashita | | B65G 1/0492 414/280 |
| 8,814,492 B2 * | 8/2014 | Perl | | B65G 57/035 414/790.8 |
| 2006/0285947 A1 * | 12/2006 | Hansl | | B65G 1/0407 414/277 |

* cited by examiner

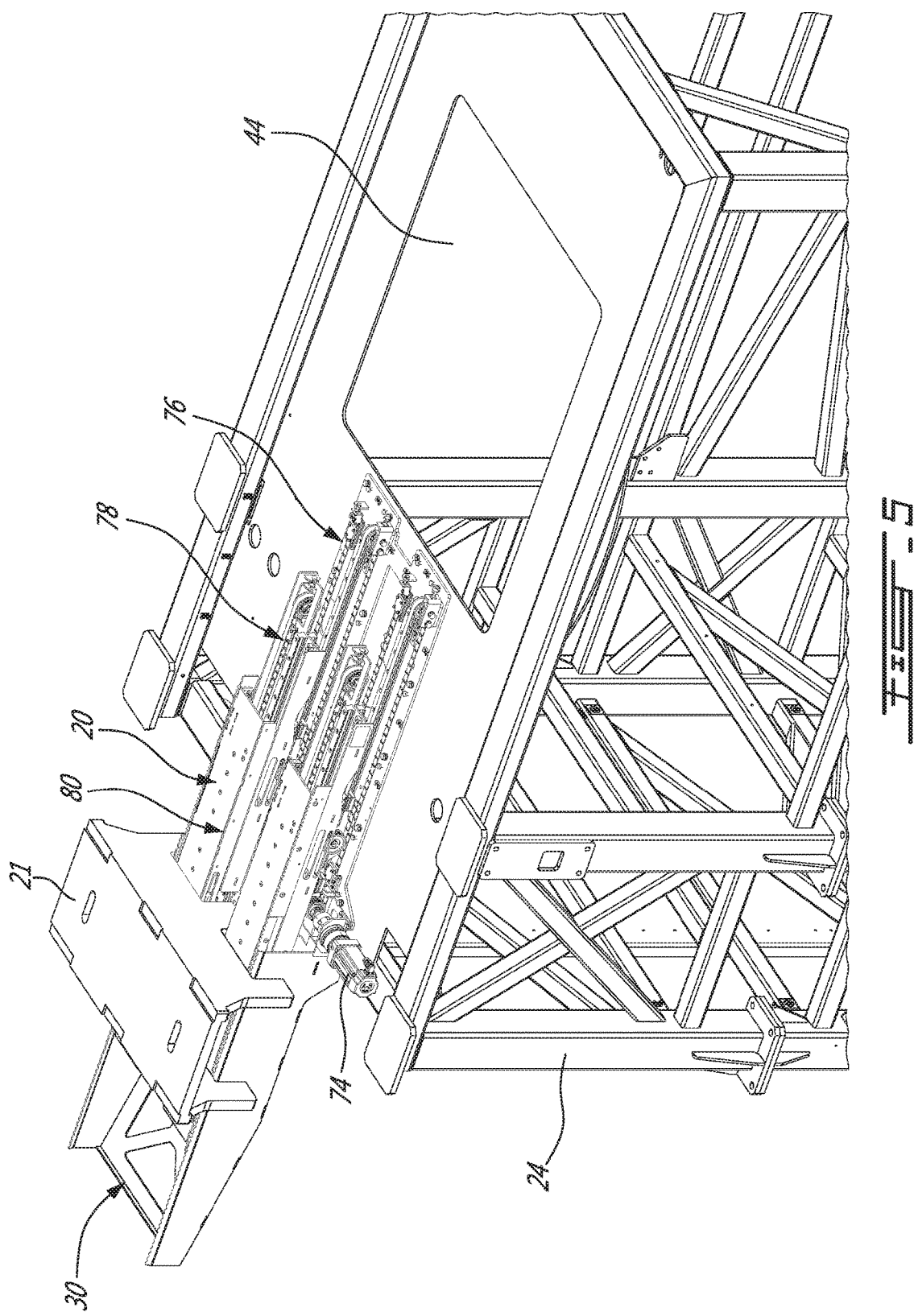

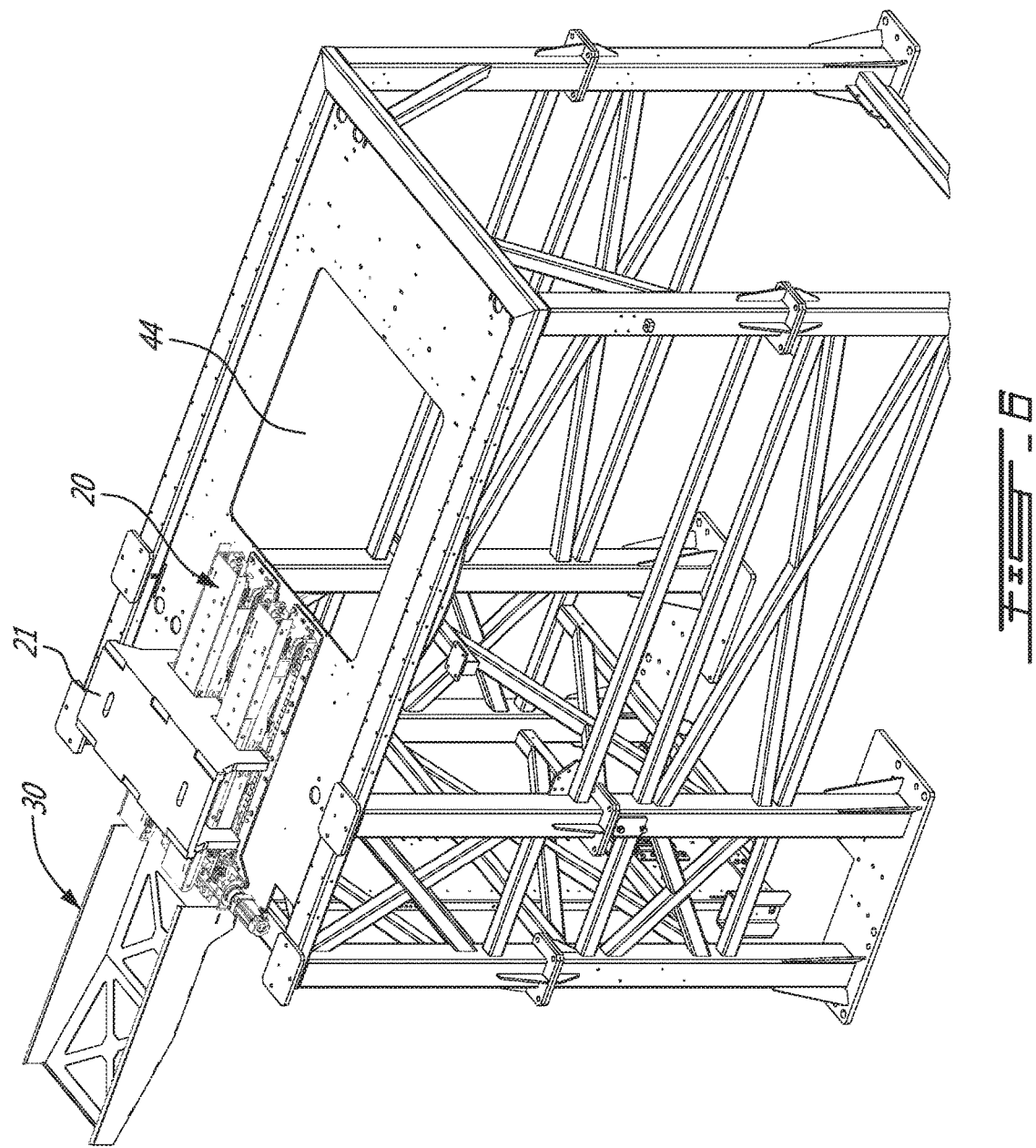

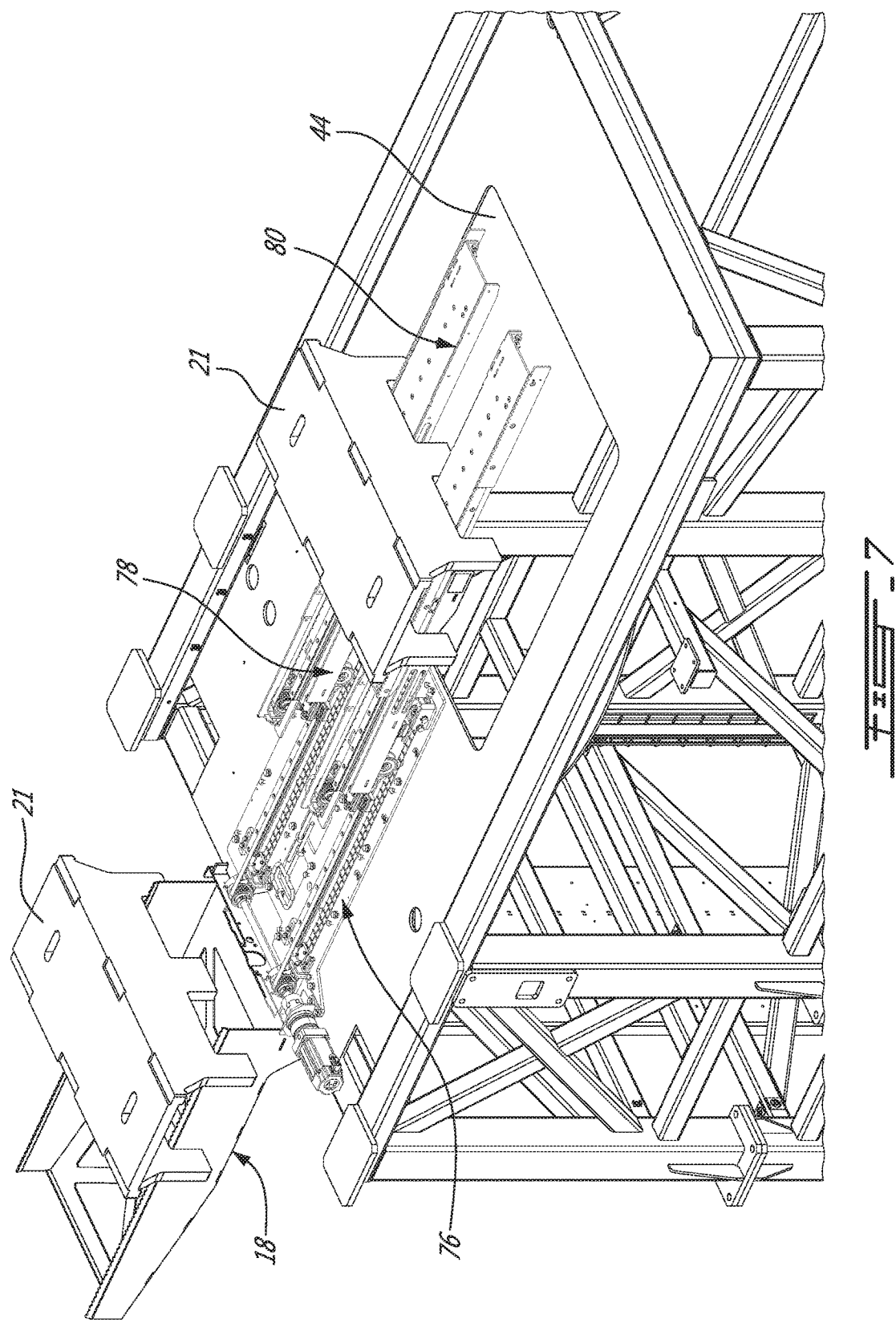

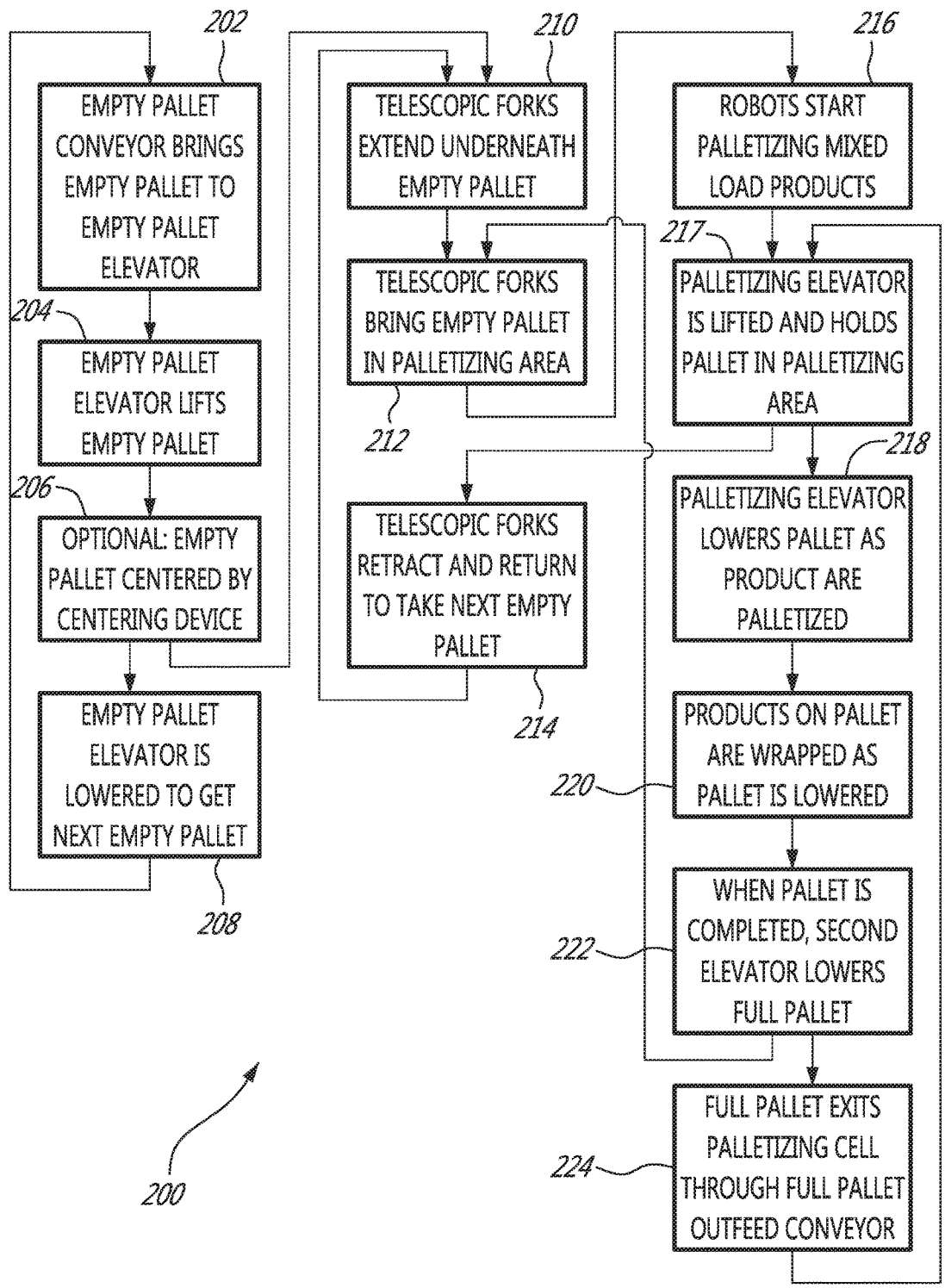

SYSTEM AND METHOD FOR PALLETIZING

CROSS-REFERENCE TO RELATED APPLICATIONS

This application claims the benefit of U.S. Provisional Application No. 62/204,157, filed on Aug. 12, 2015, the contents of which are incorporated by reference herein.

FIELD

The present disclosure relates to palletizing, and more specifically to a system and method for palletizing.

BACKGROUND

Many robotic palletizing cells are known in the art. Typically, such a palletizing cell includes one or more robot arms equipped with a product picking tool, a system that brings an empty pallet near the robot arms, and one or more conveyors that brings products to the robots to be picked thereby and positioned on the pallet.

A drawback of conventional palletizing cells is that there is waiting time inherent to the bringing of an empty pallet near the robot arms and of the exiting of a full pallet before a further pallet is filled with products.

Also, the new requirements of manufacturers and distribution centers ask for better productivity of the robotic arm, where waiting time should be minimized.

SUMMARY

The problem of waiting time in a palletizing system is solved by providing a palletizing elevator that lowers gradually as a pallet thereon is filled with products and by providing an empty pallet infeed system that moves empty pallets towards the palletizing elevator simultaneously to the palletizing of products thereon.

According to an illustrative embodiment, there is provided a palletizing system comprising:
 a palletizing elevator for receiving a first pallet at an upper level and for moving the first pallet from the upper level to a lower level as products are being moved onto the first pallet;
 at least one product picking apparatus for picking products adjacent thereof and for moving the products onto the first pallet on the palletizing elevator;
 an empty pallet elevator for moving a second pallet to the upper level; and
 an empty pallet conveying mechanism between the empty pallet elevator and the palletizing elevator for moving, at the upper level, the second pallet from the empty pallet elevator to the palletizing elevator.

According to a further illustrative embodiment, there is provided a system for the simultaneous infeed of empty pallets and outfeed of a full pallet, the system comprising:
 a palletizing elevator for receiving one of the empty pallets at an upper lever and for lowering same from the upper level to a lower level as products are moved onto said one of the empty pallets;
 an empty pallet elevator for raising another one of the empty pallets to the upper level; and
 a conveying system at the upper level between the empty pallet elevator and the palletizing elevator for moving said another one of the empty pallets from the empty pallet elevator to the palletizing elevator while said one of the empty pallets is moved by the palletizing elevator during a filling thereof.

According to another embodiment, there is provided a palletizing system comprising:
 a frame;
 a platform supported by the frame that generally defines an upper level;
 a palletizing elevator for receiving a first pallet at an upper level and for moving the first pallet from the upper level to a lower level as products are being moved onto the first pallet; the palletizing elevator comprising a pallet-receiving element that is mounted to the frame for reciprocating movement towards and away the platform;
 at least one product picking apparatus for picking products adjacent thereof and for moving the products onto the first pallet on the palletizing elevator;
 an empty pallet elevator for moving a second pallet to the upper level; the empty pallet elevator including a pallet-receiving platform that is slidably mounted to the frame; and
 a telescopic fork between the empty pallet elevator and the palletizing elevator for moving, at the upper level, the second pallet from the empty pallet elevator, to the palletizing elevator;
 at least one product infeed conveyor that is positioned at the upper level within reach of the at least one product picking apparatus for moving products adjacent to the at least one product picking apparatus; and
 the platform including an aperture over the palletizing elevator, adjacent the product picking apparatus, that allows passage for the first pallet and for the products that are moved thereon.

According to still another illustrative embodiment, there is provided a palletizing method comprising:
 receiving products to be palletized on a raised platform;
 repeatedly and simultaneously:
  raising a first empty pallet to the raised platform;
  moving a second empty pallet towards a palletizing area defined by an aperture in the raised platform; and
  moving the products on a third pallet at the palletizing area until the third pallet is filled while the third pallet is lowered from the raised platform so that an upper level of the products on the third pallet remains generally leveled with the palletizing area;
 exiting the third pallet from under the palletizing area.

The palletizing system and method according to the first illustrative embodiment allows reducing a waiting time to basically zero.

Other objects, advantages and features of the palletizing system and method will become more apparent upon reading the following non restrictive description of preferred embodiments thereof, given by way of example only with reference to the accompanying drawings.

BRIEF DESCRIPTION OF THE DRAWINGS

In the appended drawings:

FIGS. 5 to 7 are close-up partly isolated second side perspective of the empty pallet elevator and telescopic fork of the system from FIG. 1, illustrating the operation thereof; and FIG. 8 is a flowchart of a palletizing method according to an illustrated embodiment.

DETAILED DESCRIPTION

Figure 1:
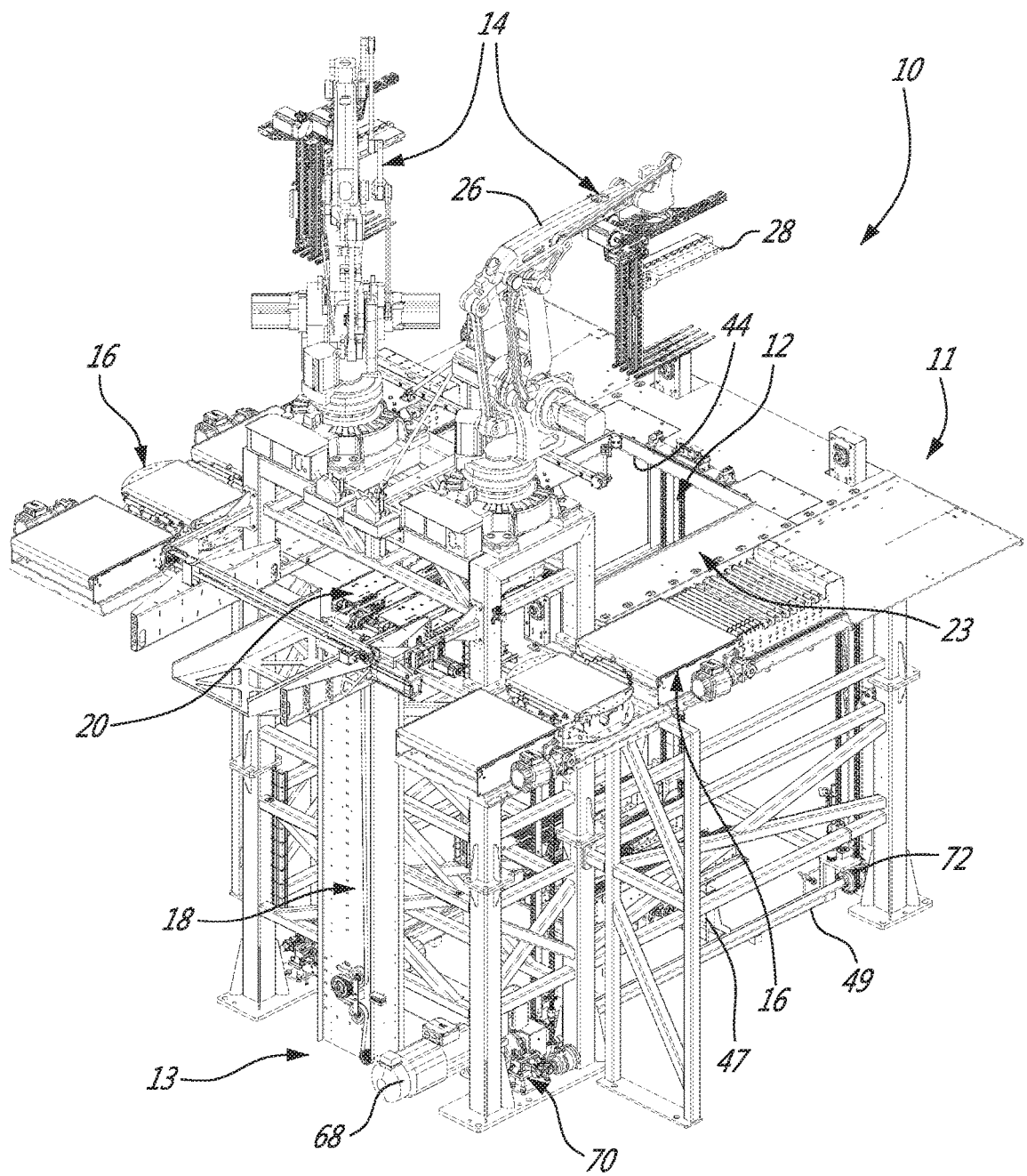
FIG. 1 is a top perspective of palletizing system according to a first illustrative embodiment; the system being shown with the empty pallet elevator at its upper position and the palletizing elevator at its lower position.

In the following description, similar features in the drawings have been given similar reference numerals, and in order not to weigh down the figures, some elements are not referred to in some figures if they were already identified in a precedent figure.

The use of the word "a" or "an" when used in conjunction with the term "comprising" in the claims and/or the specification may mean "one", but it is also consistent with the meaning of one or more", at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements.

A palletizing system 10 according to a first illustrative embodiment will now be described with reference to FIGS. 1 to 3. The expression 'palletizing cell' will also be used to refer to the palletizing system 10.

The palletizing system 10 comprises a palletizing elevator 12 for gradually lowering a pallet from a second level 11 to a first level 13 as products are being moved thereon, two product picking apparatuses 14, each for picking products (not shown) from an adjacent infeed conveyor 16 and for moving the products onto the pallet on the palletizing elevator 12, an empty pallet elevator 18 for supplying empty pallets (not shown) to the second level 11; and an empty pallet conveying mechanism 20 between the empty pallet elevator 18 and the palletizing elevator 12 for moving empty pallets 21 from the second level of the empty pallet elevator 18 to the palletizing elevator 12.

As an input, products (not shown), that can be of various sizes, arrive via the infeed conveyors 16 and are picked by one of the product picking apparatuses 14 and placed at a palletizing area 23, which corresponds to the portion of the palletizing elevator 12 on the upper level 11. Simultaneously to this operation, the empty pallet elevator 18 brings an empty pallet 21 to the empty pallet conveying mechanism 20. The mechanism 20 transfers the empty pallet 21 from the empty pallet elevator 18 to the palletizing area 23. The elevator 12 takes over the pallet 21 and lowers the pallet 21 as the products are being palletized. As an output, a full pallet (not shown) made from a variety of products is ready to be pick up by a forklift or else at the lower portion of the palletizing elevator 12.

The expression "product" should be construed herein as including any type of case, carton, tray, shrink wrapped bundle, etc.

Generally, the product is of a rectangular shape. The product dimensions may vary greatly between each different types of product. Typical dimensions (W×L×H) are between 4"×6"×2" (10.16 cm×15.24 cm×5.08 cm) and 20"×25"×24" (50.8 cm×63.5 cm×60.96 cm).

Also, the pallet is not limited to the illustrated embodiment and the system 10 can be adapted to any form of pallet.

Each of the above-cited components of the system 10 and other features and characteristics thereof will now be described in more detail.

As hinted hereinabove, the palletizing cell 10 includes a lower level 13, and an upper level 11, that is defined by a raised platform 22. This platform 22 and the equipment thereon are supported on a frame 24. The height of the platform 22 is mainly determined by the clearance required by the maximum height of a pallet filled by the system 10 on the palletizing elevator 12.

The frame 24 may be formed by integrated frame elements or by adjacent independent sub-platform, each supporting one or more components of the palletizing system 10.

The product picking apparatuses 14 are in the form for example of standard industrial articulated robot arms 26 suitable for the application, each operatively positioned adjacent to the infeed conveyor 16 and being equipped with an end of arm tool 28 to pick products on the infeed conveyor 16.

In the description and in the claim, the expressions 'robot' and 'robot arm' will be used interchangeably to mean a programmable system including articulated and/or movable members that can receive, control and move a tool.

A conventional robot arm can be used, such as ABB's or IRB 460 or 4600, FANUC's M410 or R2000, or any similar robot arm offered by other manufacturers such as Kuka or Motoman.

According to the illustrated embodiment, the end of arm tool 28 is similar to the one described in United States Patent Publ. No. US-2015-0314455-A1 published on Nov. 5, 2015 and titled "Method and Tool for Palletizing Mixed Load Products.

The system 10 is however not limited to including such a tool, which can be adapted or changed depending for example on the products to be palletized.

Since the operation of a robot and of a robot controller is believed to be well known in the art, it will not be described herein in more detail for concision purposes.

The infeed conveyors 16 are also not limited to any particular embodiment, and any conveying mechanism can be used to move products received on the upper level 11 within reach of the product picking apparatuses 14.

Figure 4:
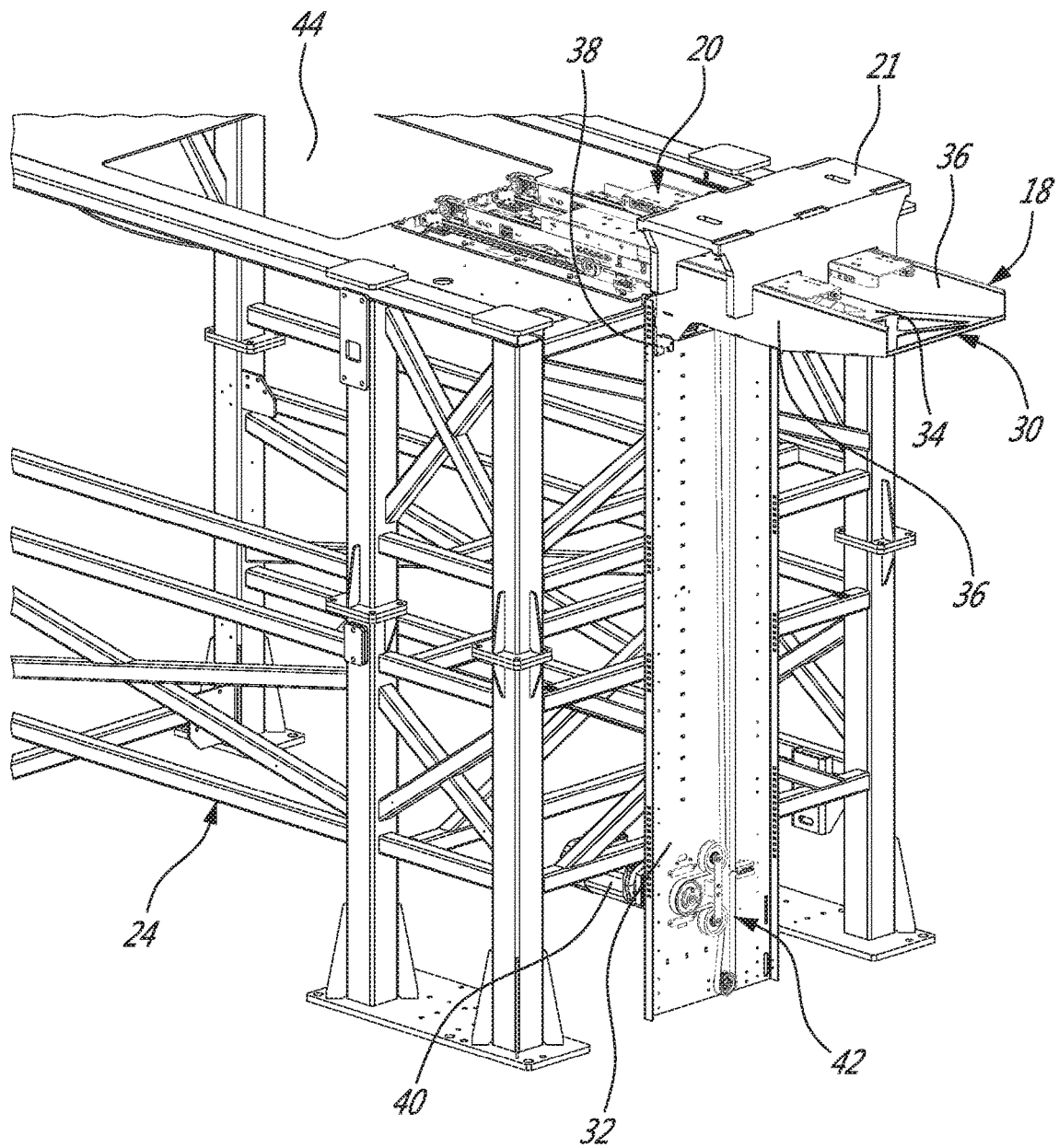
FIG. 4 is a close-up partly isolated first side perspective of the empty pallet elevator and telescopic fork of the system from FIG. 1; the elevator being shown in its upper position and the fork partially extended in its direction.

Turning briefly to FIG. 4, where the robot arms 14 and the palletizing elevator 12 were removed to alleviate the view, the empty pallet elevator 18 will now be described in more detail.

The elevator 18 comprises a pallet-receiving platform 30 that is mounted to a wall 32 for slidable movement therealong. The wall 32 extends from the first to the second levels 13 and 11 and is secured to the frame 24 on a peripheral side thereof.

The platform 30 includes a bottom 34 fixedly mounted to two side walls 36 therebetween. The side walls 36 are slidably mounted to the wall 32 via sliding elements, such as without limitations rollers (not shown) in tracks 38.

The up and down movements of the platform 30 along the wall 32 is actuated by a drive 40, which is operatively coupled to the platform 30 via a belt assembly 42 secured to the wall 32 and to the platform 30 therebetween.

The platform 30 is configured and sized for receiving a pallet 21 thereon and for slidingly receiving part of the empty pallet conveying mechanism 20 as shown in FIG. 4. The platform 30 is not limited to any size and shape and is adapted for a predetermined size and configuration of pallet. According to another embodiment (not shown), the platform 30 is defined by fork elements.

The empty pallet elevator 18 is not limited to the illustrated embodiment and can be provided with any other mechanisms to selectively lower and raise the empty pallet receiving platform 30.

Returning to FIGS. 1 to 3, the palletizing elevator 12 is distanced from the empty pallet elevator 18 by the empty-pallet conveying mechanism 20 and extends between the first and second levels 13 and 11 similarly to the empty pallet elevator 18.

The platform 22 includes a rectangular aperture 44 that allows passage 1) to an empty pallet 21 from the empty pallet conveying mechanism 20 onto the elevator 12 and then 2) for the end of arm tool 28 and products thereon. The aperture 44 is located in the palletizing area 23 wherein the product-picking apparatuses 14, which are on opposite side thereof, bring products picked on the respective infeed conveyors 16.

As already mentioned, the palletizing elevator 12 gradually lowers as products are put onto the pallet 21 so that the top level of the highest product on the pallet 21 remains generally leveled with the platform 22.

Figure 2:
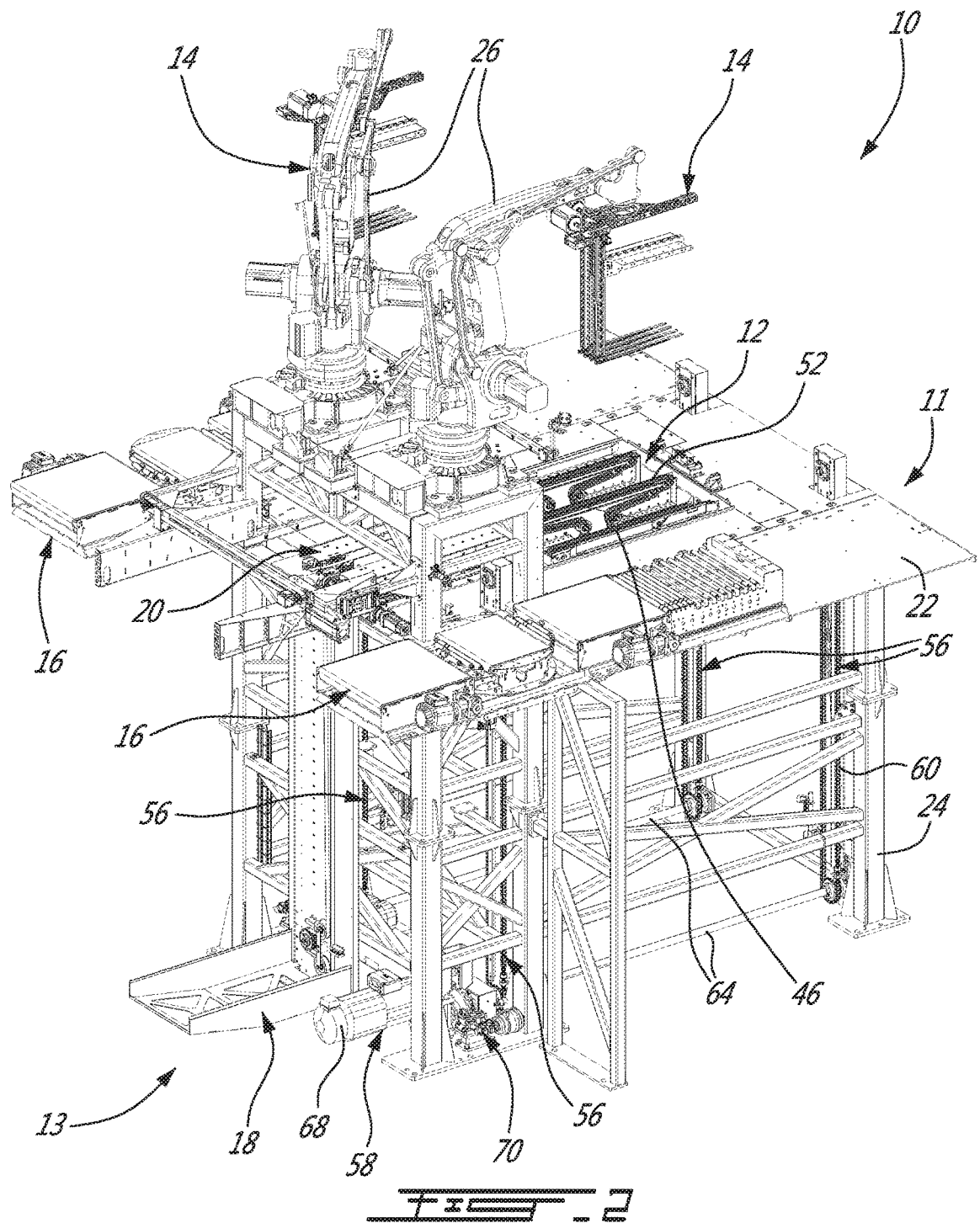
FIG. 2 is a top perspective of the palletizing system from FIG. 1; the system being shown with the empty pallet elevator at its lower position and the palletizing elevator at its upper position.
Figure 3:
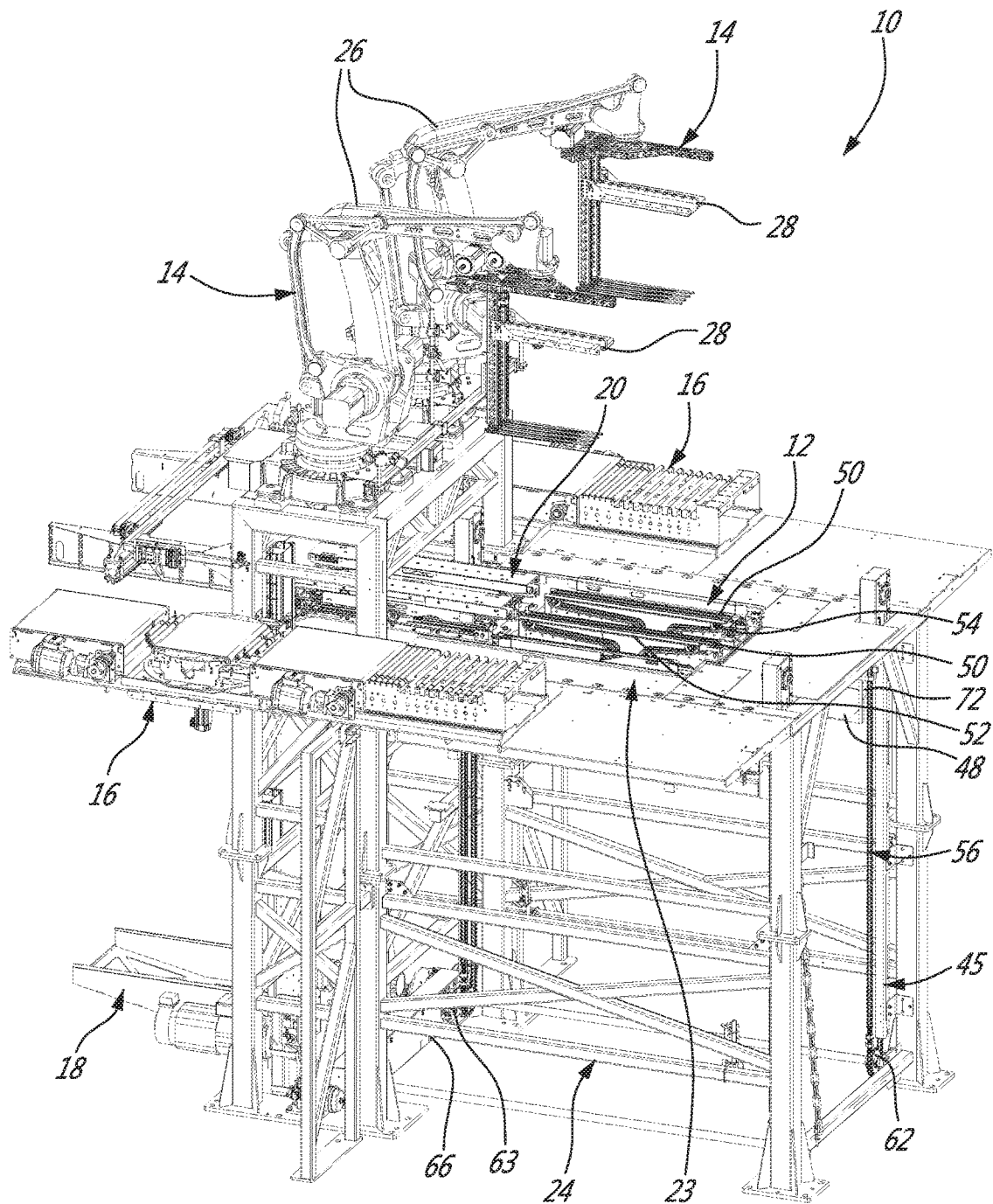
FIG. 3 is a side perspective of the palletizing system from FIG. 1; the system being shown with its telescopic fork extended towards the palletizing elevator.

With references to FIGS. 1 to 3, the palletizing elevator 12 comprises a generally rectangular pallet-receiving element 46 supported by a frame 48. The frame 48 is slidably mounted to the frame 24 via an actuating mechanism 45 for reciprocating movement of the frame 48 and pallet-receiving element 46 generally between the upper and lower level 11 and 13.

The frame 48 includes two (2) first parallel beams 47 (only one shown) secured to two (2) second parallel beams 49 transversally thereto. The frame 48 receives three (3) transversal chain assemblies 50 thereon.

Each chain assemblies 50 comprises an endless chain 52 that is operatively mounted to the frame structure 48 via a sprocket assembly 54, for rotation along an axis defined by the conveying direction of a pallet on the empty pallet conveying mechanism 20. The chain assemblies 50 together define a movable pallet-receiving element 46.

Since the configuration and operation of a chain assembly is believed to be well-known in the art, the assemblies 50 will not be described herein in more detail for concision purposes.

The number and configuration of the chain assemblies 50 are also not limited to the illustrated embodiment. Also, the pallet-receiving element 46 is not limited to being movable and other mechanism can be provided to move a pallet 21 in or out of the palletizing elevator 12.

The actuating mechanism 45 comprises four (4) chain assemblies 56 that are secured to both frames 24 and 48 therebetween and that are operated by a drive 58.

More specifically, each chain assembly 56 includes a chain 60 that is rotatably mounted to the frame 24 in an endless manner via two sprocket wheels 62 or 63 (only the lower ones shown). The chain 60 generally extends between the platform 22 and the lower level 13 along a direction generally perpendicular to the platform 22.

The chain assemblies 56 are interconnected for rotation in unison, first by two shafts 64 coaxially mounted to each two facing pairs of sprockets 62 and 63, and second by a gear assembly 66 operatively linking two adjacent sprockets 63, one from each of the afore-mentioned pairs. The drive 58 includes a motor 68 that is coupled to the gear assembly 66. The motor 68 has a built-in brake system. Each of the adjacent sprockets 63 is coupled with a disk brake 70 to ensure a safe descent of the palletizing elevator.

The frame 48 is fixedly mounted to each of the four chains 60 for movement in unison therewith via four (4) brackets 72 (only two shown) that are secured to the frame 48.

In operation of the palletizing elevator 12, the controlled actuation of the drive 58 causes the four lower sprocket wheels 62 and 63 to rotate in a same direction, causing the chains 60 to rotate in unison in an endless manner, causing the pallet-receiving element 46 to correspondingly lower or raise between the upper and lower levels 11 and 13 via the frame 48. The drive 58 operates in such a manner that the pallet-receiving element 46 lowers incrementally by step distances corresponding to the heights of each level of products added to the pallet 21. However, the raising movement of the pallet-receiving element 46 is continuous so as to bring back said element 46 to the upper level 11 ready to be filled with new products after a full pallet 21 has been removed thereon at the lower level 13.

The palletizing elevator 12 includes a further actuator (not shown) that is coupled to the chain assemblies 50 to cause the selective translation of the pallet-receiving element 46 to move a pallet filled with products out of the palletizing elevator 12 when the pallet-receiving element 46 is at the lower level 13.

The palletizing elevator 12 is not limited to the illustrated embodiment and can be provided with any other mechanisms to lower and raise the palletizing element 46.

The palletizing element 46 is also not limited to the illustrated embodiment. For example, the chain assemblies 50 can be replaced by another pallet conveying mechanism or be omitted.

Turning now to FIGS. 5 to 11, the empty pallet conveying mechanism 20 will now be described. According to the first embodiment, the mechanism 20 is in the form of a telescopic fork.

The telescopic fork 20 comprises a drive 74, a first stage 76 that is fixedly mounted to the frame 24, a second stage 78 that is slidably mounted to the first stage 76 for relative translation between two opposite longitudinal directions, and a third stage 80 that is slidably mounted to the second stage 78 for relative translation along same two opposite directions (see arrows 82 and 84 in FIG. 8).

According to the illustrated embodiment, the mechanism of the telescopic fork 20 includes a three stage system using carriages and belts in order to extend the telescopic forks from one end to the other.

FIGS. 5 to 7 shows the extent of movements or reach of the telescopic fork 20. As can be seen from these figures, the position and reach of the telescopic fork 20 is such that the third stage 80 overlays the pallet-receiving platform 30 of the empty pallet elevator 18 when the fork 20 is fully extended in that first direction (see FIG. 5) and overlays the palletizing area 44 when it is fully extended in that second direction (see FIG. 7). FIG. 6 shows the telescopic fork 20 in its un-extended neutral position. FIG. 7 further illustrates the minimizing of wait time, with the empty-pallet elevator 18 bringing an empty pallet to the telescopic fork 20 while the telescopic fork 20 brings another empty pallet 21 to the palletizing area 44.

According to another embodiment (not shown), some of the belts are replaced by a rack and pinion system to move the telescopic forks from one end to the other.

The operation of the palletizing system 10 will now be described with reference to FIGS. 1 to 7 and to an illustrative embodiment of a palletizing method 200 as shown in FIG. 8.

An empty pallet conveyor (not shown) brings empty pallets 21 one by one to the empty pallet elevator 18 (step 202). Once an empty pallet 21 is on the platform 30, the elevator 18 lifts the empty pallet 21 to the upper level 11 of the system 10 (step 204).

The palletizing system 10 includes, in some embodiment, a centering device (not shown) that centers the empty pallet 21 once it reaches the upper level 11 (step 206).

The telescopic fork mechanism 20 is extended underneath the empty pallet 21 brought by the elevator 18 to remove it from the elevator's platform 30 (step 210).

Moving to the opposite direction, the telescopic fork 20 brings the empty pallet 21 to the palletizing area 44 (step 212).

When the empty pallet 21 clears the empty pallet elevator's platform 30, as it is transferred on the telescopic fork 20; the platform 30 is lowered to pick the next empty pallet 21 supplied by the empty pallet conveyor (step 208).

In the meantime, as the empty pallet 21 reaches the palletizing area 44, the robots 14 start palletizing products (not shown) who are supplied by the product infeed conveyors 16, using its end of arm tool 28 (step 216).

When the pallet is supported by the palletizing elevator 12 (step 217), the telescopic forks 20 move to towards the empty pallet elevator 18 to take the next empty pallet 21 (step 214) that was in the meantime raised by the elevator 18 (step 204).

As more products are added on the pallet by the robots 14, the palletizing elevator 12 is lowered so that the top level of the products on the pallet being filled remains in the palletizing area 44 (step 218).

The palletizing elevator lowers the pallet in steps as more products are being palletized by the robots 14.

As the palletizing elevator 12 lowers the pallet, the palletized products are stretched wrapped (step 220).

When the palletizing sequence is completed, the palletizing elevator 12 lowers the full pallet (step 222) to be transferred for example to a full pallet exit conveyor (not shown) (step 224).

As the pallet exits the palletizing cell, the palletizing elevator 12 is raised to hold a new pallet 21 in the palletizing area 44.

This above sequence is repeated as the products are being palletized.

The components of the system 10, such as the robots 14, product conveying systems 16, palletizing and empty pallet elevators 12 and 18, and empty pallet conveying mechanism 20 are coupled and controlled by a single or a plurality of controllers or electronic devices (both not shown), including for example one or more computers, that are configured with components and/or programmed with instructions that produce one or more functionalities.

It is to be noted that many other modifications could be made to the palletizing system and method described hereinabove and illustrated in the appended drawings. For example:

while the illustrated embodiment is shown and described having two robot arms, a single one can also be used; each or both of the robot arms can be replaced by a gantry type equipment or any other similar means;

the telescopic fork mechanism movement can be actuated by a standard rack and pinion system;

the telescopic fork mechanism could be replaced by another empty pallet conveying system such as a pusher system, a conventional conveyor system or a shuttle system;

the empty pallet infeed conveyor can be replaced by other means to supply empty pallet to the empty pallet elevator;

the full pallet outfeed conveyor can be replaced by other means to remove full pallets.

It is to be understood that embodiments of the palletizing system and method are not limited in their application to the details of construction and parts illustrated in the accompanying drawings and described hereinabove. Other embodiments can be foreseen and practiced in various ways. It is also to be understood that the phraseology or terminology used herein is for the purpose of description and not limitation.

What is claimed is:

1. A palletizing system comprising:
a palletizing elevator for receiving a first pallet at an upper level and for moving the first pallet from the upper level to a lower level as products are being moved onto the first pallet;
at least one product picking apparatus for picking products adjacent thereof and for moving the products onto the first pallet on the palletizing elevator;
an empty pallet elevator for moving a second pallet to the upper level; and
an empty pallet conveying mechanism between the empty pallet elevator and the palletizing elevator for moving, at the upper level, the second pallet from the empty pallet elevator to the palletizing elevator, the empty pallet conveying mechanism being articulated between a retracted position, interposed between the empty pallet elevator and the palletizing elevator, and extended positions on opposite sides of the retracted position, the empty pallet conveying mechanism being extended in opposite directions from the retracted position so that a first extension position extends over the empty pallet elevator on one of the opposite sides of the retracted position and a second extended position extends over the palletizing elevator on the other of the opposite sides of the retracted position, wherein the empty pallet conveying mechanism has a common empty pallet support surface supporting each of the first pallet and the second pallet throughout articulation of the empty pallet conveying mechanism from the first extension position, through the retracted position, to the second extension position on opposite sides or the retracted position;
wherein the empty pallet conveying mechanism includes a telescopic fork.

2. The system of claim 1, further comprising:
a frame;
a platform, supported by the frame, that generally defines the upper level; and
the palletizing elevator comprising a pallet-receiving element that is mounted to the frame for reciprocating movement towards and away the platform.

3. The system of claim 2, wherein the platform includes an aperture over the palletizing elevator, adjacent the product picking apparatus, that allows passage for the products that are moved thereon.

4. The system of claim 2, wherein the pallet-receiving element includes a movable surface for moving the first pallet out of the palletizing elevator at the lower level.

5. The system of claim 1, wherein the empty pallet elevator includes a pallet-receiving platform that is slidably mounted to a wall for movements towards and away the upper and lower levels.

6. The system of claim 1, wherein the empty pallet conveying mechanism includes at least one of a pusher, a conveyor, a fork and a shuttle.

7. The system of claim 1, wherein the telescopic fork includes a first stage secured to a frame, a second stage that is slidably mounted to the first stage for translation of the second stage onto the first stage between two opposite longitudinal directions, and a third stage that is slidably mounted to the second stage for translation of the third stage onto the second stage between the two opposite longitudinal directions.

8. The system of claim 1, wherein, in operation, the telescopic fork extends between a first position wherein the third stage overlays at least partially the empty pallet elevator, and a second position wherein the third stage overlays at least partially the palletizing elevator.

9. The system of claim 1, further comprising at least one product infeed conveyor that is positioned at the upper level within reach of the at least one product picking apparatus for moving products adjacent to the at least one product picking apparatus.

10. The system of claim 1, wherein the upper level is defined by a raised platform.

11. The system of claim 10, wherein the raised platform includes an aperture over the palletizing elevator, adjacent to the product picking apparatus, that allows passage for the first pallet and for the products that are moved thereon.

12. The system of claim 1, wherein the at least one product picking apparatus includes two product picking apparatuses.

13. The system of claim 1, wherein the at least one product picking apparatus is in the form of a robot arm equipped with an end of arm tool.

14. The system of claim 1, wherein products are selected from the group consisting of cases, cartons, trays and shrink wrapped bundles.

15. A system for the simultaneous infeed of empty pallets and outfeed of a full pallet, the system comprising:
   a palletizing elevator for receiving one of the empty pallets at an upper lever and for lowering same from the upper level to a lower level as products are moved onto said one of the empty pallets;
   an empty pallet elevator for raising another one of the empty pallets to the upper level; and
   a conveying system at the upper level between the empty pallet elevator and the palletizing elevator for moving said another one of the empty pallets from the empty pallet elevator to the palletizing elevator while said one of the empty pallets is moved by the palletizing elevator during a filling thereof, the conveying system being articulated between a retracted position, interposed between the empty pallet elevator and the palletizing elevator, and extended positions on opposite sides of the retracted position, the conveying system being extended in opposite directions from the retracted position so that a first extension position extends over the empty pallet elevator on one of the opposite sides of the retracted position and a second extended position extends over the palletizing elevator on the other of the opposite sides of the retracted position, wherein the empty pallet conveying mechanism has a common empty pallet support surface supporting each of the one of the empty pallets and the other one of the empty pallets throughout articulation of the empty pallet conveying mechanism from the first extension position, through the retracted position, to the second extension position on opposite sides or the retracted position;
   wherein the conveying system includes a telescopic fork.

16. The system of claim 15, further comprising:
   a frame;
   a platform supported by the frame that generally defines the upper level; and
   the palletizing elevator comprising a pallet-receiving element that is mounted to the frame for reciprocating movement towards and away the platform.

17. The system of claim 16, wherein the platform includes an aperture over the palletizing elevator that allows passage for said one of the empty pallets and for the products that are moved thereon.

18. The system of claim 16, wherein the pallet-receiving element includes a pallet-receiving surface that is movable for biasing said one of the empty-pallet thereon.

19. The system of claim 15, wherein the empty pallet elevator includes a pallet-receiving platform that is slidably mounted to a wall for movements towards and away the upper and lower levels.

20. The system of claim 19, wherein the empty pallet-receiving platform is actuated by a drive that is operatively coupled to the pallet-receiving platform via a chain assembly.

21. The system of claim 15, wherein the telescopic fork includes a first stage secured to a frame, a second stage that is slidably mounted to the first stage for translation of the second stage onto the first stage between two opposite longitudinal directions, and a third stage that is slidably mounted to the second stage for translation of the third stage onto the second stage between the two opposite longitudinal directions.

22. The system of claim 21, wherein the telescopic fork is extendable between a first position wherein the third stage overlays at least partially the empty pallet elevator, and a second position wherein the third stage overlays at least partially the palletizing elevator.

23. A palletizing method for a palletizing system, where the palletizing system includes
   a palletizing elevator for receiving a first pallet at an upper level and for moving the first pallet from the upper level to a lower level as products are being moved onto the first pallet;
   at least one product picking apparatus for picking products adjacent thereof and for moving the products onto the first pallet on the palletizing elevator;
   an empty pallet elevator for moving a second pallet to the upper level; and
   an empty pallet conveying mechanism between the empty pallet elevator and the palletizing elevator for moving, at the upper level, the second pallet from the empty pallet elevator to the palletizing elevator, the empty pallet conveying mechanism being articulated between a retracted position, interposed between the empty pallet elevator and the palletizing elevator, and extended positions on opposite sides of the retracted position, the empty pallet conveying mechanism being extended in opposite directions from the retracted position so that a first extension position extends over the empty pallet elevator on one of the opposite sides of the retracted position and a second extended position extends over the palletizing elevator on the other of the opposite sides of the retracted position, and the method comprising:

receiving products to be palletized on a raised platform;

repeatedly and simultaneously:
- raising a first empty pallet to the raised platform;
- moving a second empty pallet, on the raised platform, towards a palletizing area defined by an aperture in the raised platform; and
- moving the products on a third pallet at the palletizing area until the third pallet is filled while the third pallet is lowered from the raised platform so that an upper level of the products on the third pallet remains generally leveled with the palletizing area;

exiting the third pallet from under the palletizing area.

24. The method of claim 23, wherein the third pallet is lowered gradually from the raised platform as the products are moved onto the third pallet.

25. The method of claim 24, wherein the third pallet is lowered by steps so that a top level of the products on the third pallet remains generally leveled with the raised platform.

26. The method of claim 23, further comprising centering the first empty pallet after it has been raised to the first platform.

27. A palletizing system comprising:
- a frame;
- a platform supported by the frame that generally defines an upper level;
- a palletizing elevator for receiving a first pallet at an upper level and for moving the first pallet from the upper level to a lower level as products are being moved onto the first pallet, the palletizing elevator comprising a pallet-receiving element that is mounted to the frame for reciprocating movement towards and away from the platform;
- at least one product picking apparatus for picking products adjacent thereof and for moving the products onto the first pallet on the palletizing elevator;
- an empty pallet elevator for moving a second pallet to the upper level, the empty pallet elevator including a pallet-receiving platform that is slidably mounted to the frame;
- a telescopic fork disposed between the empty pallet elevator and the palletizing elevator for moving, at the upper level, the second pallet from the empty pallet elevator, to the palletizing elevator, the telescopic fork being articulated between a retracted position, interposed between the empty pallet elevator and the palletizing elevator, and extended positions on opposite sides of the retracted position, the telescopic fork being extended in opposite directions from the retracted position so that a first extension position extends over the empty pallet elevator on one of the opposite sides of the retracted position and a second extended position extends over the palletizing elevator on the other of the opposite sides of the retracted position;
- at least one product infeed conveyor that is positioned at the upper level within reach of the at least one product picking apparatus for moving products adjacent to the at least one product picking apparatus; and
- the platform including an aperture over the palletizing elevator, adjacent the product picking apparatus, that allows passage for the first pallet and for the products that are moved thereon.

* * * * *